United States Patent
Sundgren et al.

(10) Patent No.: US 6,471,292 B1
(45) Date of Patent: Oct. 29, 2002

(54) FRAME FOR A VEHICLE SEAT

(75) Inventors: Anders Sundgren, Sunderbyn; Mats Lindberg, Luleå; Göran Berglund, Gammelstad, all of (SE)

(73) Assignee: Accra Teknik AB, Öjebyn (SE)

( * ) Notice: Subject to any disclaimer, the term of this patent is extended or adjusted under 35 U.S.C. 154(b) by 0 days.

(21) Appl. No.: 09/646,274

(22) PCT Filed: Mar. 17, 1999

(86) PCT No.: PCT/SE99/00411

§ 371 (c)(1),
(2), (4) Date: Nov. 27, 2000

(87) PCT Pub. No.: WO99/47279

PCT Pub. Date: Sep. 23, 1999

(30) Foreign Application Priority Data

Mar. 17, 1998 (SE) .............................................. 9800883

(51) Int. Cl.⁷ ................................................ B60N 2/42
(52) U.S. Cl. ................................. 297/216.13; 297/452.2
(58) Field of Search ........................ 297/452.18, 452.2, 297/216.13, 216.14, 216.1

(56) References Cited

U.S. PATENT DOCUMENTS

5,791,738 A * 8/1998 Niezoldt

FOREIGN PATENT DOCUMENTS

| DE | C 37 06 394 |   | 5/1988 |
| DE | 4303006 | * | 4/1994 |
| DE | A 42 38 549 |   | 5/1994 |
| EP | A 0 372 337 |   | 6/1990 |
| WO | 9714588 | * | 4/1997 |

* cited by examiner

Primary Examiner—Milton Nelson, Jr.
(74) Attorney, Agent, or Firm—Ware, Fressola, Van der Sluys & Adolphson LLP

(57) ABSTRACT

A frame (1) for a vehicle seat is intended to be deformed, in part elastically and in part plastically, under the influence of forces, for example, in connection with a collision. The frame (1) is made from a metallic, hardened material. The frame absorbs energy during the plastic deformation by having at least one deformation zone (5) that has been imparted a reduced resistance via tempering of a portion of the metallic, hardened material.

12 Claims, 1 Drawing Sheet

FRAME FOR A VEHICLE SEAT

BACKGROUND OF THE INVENTION

1. Technical Field

The present invention relates to a frame for a vehicle seat that is intended to be deformed, in part elastically and in part plastically, under the influence of forces, for example, in connection with a collision, whereby the frame is executed in a metallic, hardened material.

2. Description of the Background Art

A frame for a vehicle seat, whereby the said frame is executed in one piece and in a comparatively thin material, is previously known from DE-A-42 38 549. In this way, in the event of a collision, the material in the frame will be deformed in a ductile manner in the areas with the greatest concentration of tension without the frame being provided with specially designed deformation zones.

A vehicle seat that has a frame partly in plastic material and partly in metallic material, whereby part of the metallic material is connected to the sitting section of the seat, is previously known from EP-A-0 372 337. The part of the frame composed of plastic is attached to the part made of metallic material, whereby the latter is provided with a deformation zone with notches for folding.

DE-C-37 06 394 relates to a front seat in a vehicle, whereby the side portions of the frame consist of two sheet plates that are joined with one another at certain points, whereby the deformation zone is arranged between the said points. The deformation zones have been achieved by providing the plates with bulges located opposite one another and that have an extension across the main plane of the frame in a direction away from one another. The geometry and elastic limits of the deformation zones vary along the height of the seat.

For all of the documents referred to above, the deformation zones are achieved by the whole seat being given a special geometric design or the said deformation zones being given a special geometric design. Manufacturing such frames is associated with high costs as the construction design of the deformation zones differs significantly from the frame in general.

SUMMARY OF THE INVENTION

The primary objective of the present invention is to specify a frame for a vehicle seat, whereby the frame has demarcated deformation zones without these areas having a special geometric design, i.e., the frame can in principle can have the same geometric design in the deformation zones as in sections of the frame situated on either side of these areas. A further objective of the invention is that the application of the deformation zones takes place as a separate step after the frame has been manufactured. Yet another objective of the invention is that it shall be applicable to frames of in principle any geometric design.

The objectives of the invention are achieved by means of a frame for a vehicle seat that has the characteristics stated in the claims that follow.

BRIEF DESCRIPTION OF THE DRAWING

An example of an embodiment of the invention will be described below with reference to the enclosed drawings, where.

DETAILED DESCRIPTION OF THE INVENTION

Figure 1:
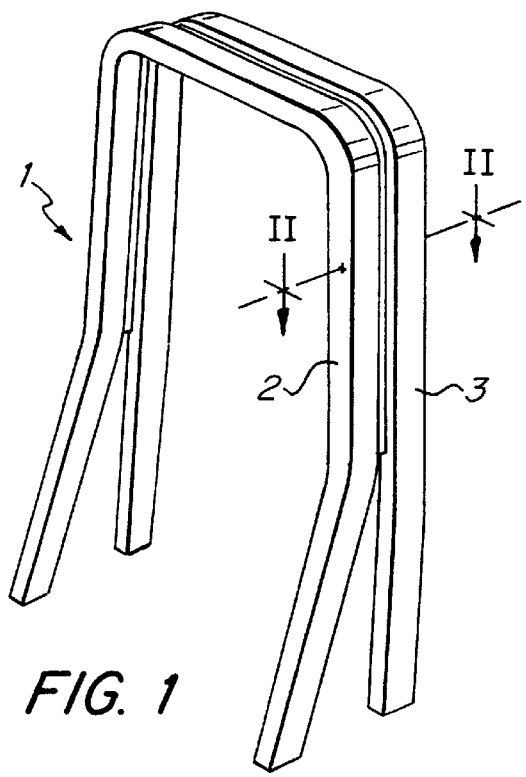
FIG. 1 shows a perspective view of a typical frame for a vehicle seat for which the invention is applicable.

The common U-shaped frame 1 shown in FIG. 1 includes two tube-like parts 2 and 3 that are joined to one another along the upper part of the frame 1 by means of a mid-section 4. In the lower portion of the frame, i.e., the area of the free ends of the tube-like parts 2, 3, the tube-like parts 2, 3 are separated from one another in a direction that primarily coincides with the extension of the mid-section 4 when the said mid-section 4 ends, which occurs in the change-over between the upper and lower portions of the frame. As is evident from FIG. 1 and others, the closely located tube-like parts 2 and 3 form a V in the lower portion of the frame 1, whereby there is no joining mid-section between the said tube-like parts 2 and 3.

Figure 2:
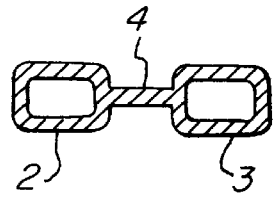
FIG. 2 shows a cross-section through the frame along the II—II line of FIG. 1.

In the example of the embodiment shown (see FIG. 2), the tube-like parts 2 and 3 have a cross-section that is somewhat elongated in the direction of the mid-section 4. Within the scope of the invention, however, one can consider other cross-sectional forms when one can mention circular and elliptical forms as examples without restricting the occurrence of others.

According to FIG. 1, frame 1 is manufactured in a metallic, hardened material, i.e., after frame 1 has been given the appearance shown in FIG. 1, it is subjected to hardening to acquire improved resistance properties. The said hardening can be achieved by, for example, press hardening.

Figure 3:
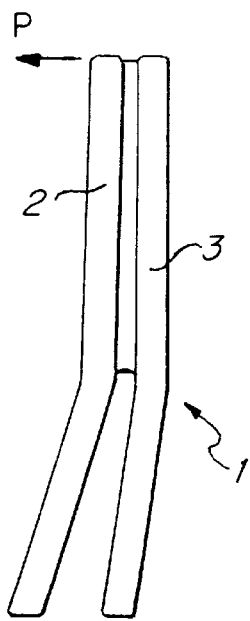
FIG. 3 shows a side view of the frame with a typically damaging force during a collision.
Figure 4:
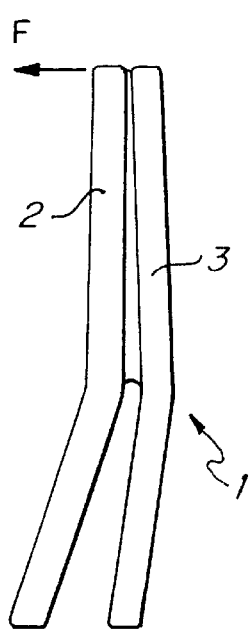
FIG. 4 shows a side view of the frame when it has been subjected to plastic deformation.

FIG. 3 illustrates how the frame 1 is subjected to a force P that is directed in the normal direction of travel of the vehicle, whereby such a force P occurs during a sudden retardation of the vehicle. When force P is applied to the frame 1, the frame is subjected to a force and thus also to an initial elastic deformation in the direction of the arrow, whereby the said elastic deformation normally means that that the frame, at its upper section, has a degree of freedom of movement in the order of 20–30 mm in the direction of the said arrow. That the deformation is elastic means that frame 1 regains its original shape if force P is removed. If force F is sufficiently large or acts for a sufficiently long time, however, the elastic deformation will be transformed into a plastic deformation, i.e. the deformation becomes permanent. If FIG. 4 is examined in greater detail, it will be evident that such a plastic deformation or so-called collapse has been acquired in the upper section of the relatively weak mid-section 4 that joins the tube-shaped sections 2, 3 of the frame 1. It should be realised here that a large part of the retardation force F that occurs in connection with a collision is absorbed in a manner that is gentle on the seat's occupant when the said mid-section 4 collapses.

Figure 5:
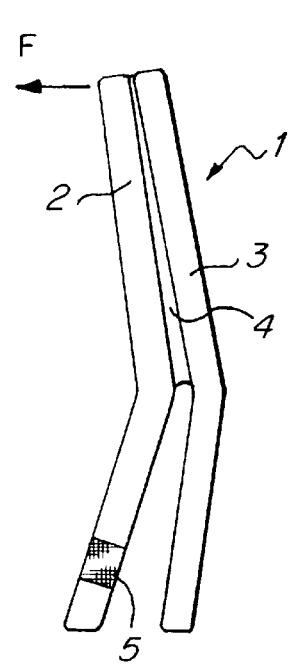
FIG. 5 shows a side view of the frame when it has been subjected to plastic deformation and provided with a deformation zone according to the invention.

In addition to the energy-absorbing mid-section 4 located between tube-shaped sections 2, 3, the frame 1 shown schematically in FIG. 5 includes two energy-absorbing deformation zones 5 (only one shown in FIG. 5). In the example of the embodiment shown, these areas are located in tube-like section 2 in the lower portion of the frame 1 and, more precisely, in the area of the free ends of the said tube-like section 2. The energy-absorbing deformation zones 5 are achieved according to the invention by the said areas of the hardened frame 1 being tempered, i.e., the said area is heated to a temperature in the range 160–650° C. In this way, the martensite structure in frame 1 that was achieved by hardening is transformed to another structure in the deformation zones, which by this means thus acquire a reduced resistance compared with frame 1 in general. This means that when the initial elastic deformation (see FIG. 3) is transformed into a plastic deformation, the deformation zones 5 in FIG. 5 will collapse and thereby become energy-absorbing. When the tempered deformation zones 5 reach the limit of their deformation, which can normally mean a plastic deformation of about 150 mm at the upper edge of the frame in the direction of the arrow F in FIG. 4, the deformation returns to being elastic, which means that a further deformation of about 20–30 mm can be accommodated by the frame 1 according to the invention.

The frame 1 according to the invention that is described in the example of an embodiment above is provided with V-shaped sections. The invention is, however, also suitable for frames with other geometric designs. It is nevertheless suitable for the deformation zones to be positioned in the area of the seat that is subjected to compression forces in connection with a collision. In that way, elastic, plastic and further elastic deformation, in that order, can be accommodated.

Within the scope of the invention, the arrangement of several deformation zones in the frame of a seat can also be considered. In particular, the deformation zones can be located in sections of the frame 1 that are subjected to different concentrations of tension, for example, during a collision, whereby the deformation zone located in the section where the greatest concentration of tension is applied will collapse first, after which the deformation zone located in the section where there is the next greatest concentration of tension collapses, etc. In this way, a controlled, predictable collapse of a frame for a vehicle seat is obtained.

The invention is not limited to that described and shown in the drawings but can be changed and modified in a number of different ways within the scope of the concept of the invention stated in the following claims.

What is claimed is:

1. Frame for a vehicle seat that is intended to be deformed, in part elastically and in part plastically, under influence of forces, the frame comprising a metallic, hardened material having at least one deformation zone that, due to tempering, has been given a reduced resistance and absorbs energy during plastic deformation.

2. Frame according to claim 1, wherein the frame includes at least one tubular part.

3. Frame according to claim 2, wherein the at least one tubular part is two tubular parts and the at least one deformation zone is two deformation zones located in one of the tubular parts located furthest forward when seen in a normal forward direction of travel of a vehicle in which the frame is used and located adjacent free ends of the one of the tubular parts.

4. Frame according to claim 1, wherein the frame includes two tubular parts that, at least along a portion of the frame, are joined to one another by means of a mid-section.

5. Frame according to claim 4, wherein the at least one deformation zone is two deformation zones located in one of the tubular parts located furthest forward when seen in a normal forward direction of travel of a vehicle in which the frame is used and located adjacent free ends of the one of the tubular parts.

6. Frame according to claim 4, wherein the two tubular parts form a V-shape between one another in a portion of the frame where the two tubular parts are not joined by means of the mid-section.

7. Frame according to claim 6, wherein the frame is generally U-shaped.

8. Frame according to claim 6, wherein the at least one deformation zone is located where the two tubular parts form the V-shape between one another.

9. Frame according to claim 1, wherein at least one deformation zone is located in a lower portion of the frame.

10. Frame according to claim 1, wherein the at least one deformation zone is located in a portion of the frame that is located furthest forward when seen in a normal forward direction of travel of a vehicle in which the frame is used.

11. Frame according to claim 1, wherein at least one area of the metallic, hardened material, during tempering, is heated to a temperature in the range of 160–650° C. to form the at least one deformation zone.

12. Frame according to claim 1, wherein the frame is generally U-shaped.

* * * * *